United States Patent
Busin et al.

(10) Patent No.: US 8,260,250 B2
(45) Date of Patent: Sep. 4, 2012

(54) METHOD AND APPARATUS FOR HANDLING EMERGENCY CALLS IN A PACKET SWITCHED RADIO ACCESS NETWORK

(75) Inventors: Ake Busin, Sollentuna (SE); Magnus Olsson, Stockholm (SE); Stephen Terrill, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1012 days.

(21) Appl. No.: 11/795,607

(22) PCT Filed: Jan. 18, 2006

(86) PCT No.: PCT/SE2006/000078
§ 371 (c)(1),
(2), (4) Date: Jun. 2, 2008

(87) PCT Pub. No.: WO2006/078212
PCT Pub. Date: Jul. 27, 2006

(65) Prior Publication Data
US 2008/0268809 A1    Oct. 30, 2008

(30) Foreign Application Priority Data
Jan. 19, 2005 (SE) .......................... 0500165

(51) Int. Cl.
*H04M 11/04* (2006.01)
*H04L 12/66* (2006.01)
(52) U.S. Cl. ............... 455/404.2; 370/352; 370/355; 379/37; 379/45; 455/404.1
(58) Field of Classification Search .... 455/456.1–456.6, 455/404.1–404.2; 370/259, 351–356; 379/37–51
See application file for complete search history.

(56) References Cited

U.S. PATENT DOCUMENTS

| | | | |
|---|---|---|---|
| 5,712,900 A * | 1/1998 | Maupin et al. | 455/433 |
| 6,678,357 B2 * | 1/2004 | Stumer et al. | 379/45 |
| 6,799,017 B1 | 9/2004 | Kregel | |

(Continued)

FOREIGN PATENT DOCUMENTS
JP    2000048050    2/2000
(Continued)

OTHER PUBLICATIONS
International Search Report for International Application No. PCT/SE2006/000078, mailed May 4, 2006.
(Continued)

*Primary Examiner* — Matthew Sams
(74) *Attorney, Agent, or Firm* — Nixon & Vanderhye P.C.

(57) ABSTRACT

A method and apparatus for providing location information for subscribers connected to a packet-switched mobile access network in connection with emergency calls made over a multimedia service network. An emergency request is received at the multimedia service network from a subscriber containing the calling number of the subscriber. In response thereto, a media gateway control function in the multimedia service network sends a location query including the calling number to a mobile positioning center in the mobile access network, which then can retrieve location information for the subscriber. After receiving location information from the mobile positioning center, the media gateway control function selects an emergency center and sends a location indication for the subscriber thereto in a circuit-switched control message for initiating an emergency call, according to prevailing standards.

14 Claims, 3 Drawing Sheets

U.S. PATENT DOCUMENTS

| | | | |
|---|---|---|---|
| 6,922,565 B2* | 7/2005 | Rhodes et al. | 455/456.1 |
| 6,963,557 B2* | 11/2005 | Knox | 370/352 |
| 6,990,329 B2* | 1/2006 | Deinzer | 455/404.1 |
| 7,031,714 B1* | 4/2006 | Rayburn | 455/445 |
| 7,031,722 B2* | 4/2006 | Naghian | 455/456.1 |
| 7,177,623 B2* | 2/2007 | Baldwin | 455/404.2 |
| 7,317,910 B2* | 1/2008 | Niemenmaa et al. | 455/414.2 |
| 7,623,447 B1* | 11/2009 | Faccin et al. | 370/230 |
| 7,702,079 B2* | 4/2010 | Schaade et al. | 379/9.05 |
| 7,738,855 B2* | 6/2010 | Jang et al. | 455/404.1 |
| 2003/0063714 A1* | 4/2003 | Stumer et al. | 379/37 |
| 2003/0108175 A1 | 6/2003 | Poikselka et al. | |
| 2003/0176180 A1* | 9/2003 | Deinzer | 455/404.1 |
| 2003/0186709 A1* | 10/2003 | Rhodes et al. | 455/456.1 |
| 2004/0121755 A1* | 6/2004 | Hurtta | 455/404.1 |
| 2004/0137873 A1* | 7/2004 | Kauppinen et al. | 455/404.1 |
| 2004/0184584 A1* | 9/2004 | McCalmont et al. | 379/45 |
| 2004/0242227 A1* | 12/2004 | Huotari et al. | 455/432.1 |
| 2005/0186948 A1* | 8/2005 | Gallagher et al. | 455/414.1 |
| 2005/0190892 A1* | 9/2005 | Dawson et al. | 379/37 |
| 2006/0072547 A1* | 4/2006 | Florkey et al. | 370/352 |
| 2007/0041513 A1* | 2/2007 | Gende | 379/37 |
| 2007/0115946 A1* | 5/2007 | Schaade et al. | 370/356 |
| 2007/0135089 A1* | 6/2007 | Edge et al. | 455/404.1 |
| 2007/0238448 A1* | 10/2007 | Gallagher et al. | 455/414.2 |
| 2008/0108319 A1* | 5/2008 | Gallagher | 455/404.2 |

FOREIGN PATENT DOCUMENTS

| | | |
|---|---|---|
| JP | 2001-109977 | 4/2001 |
| JP | 2001-1245360 | 9/2001 |
| JP | 2002-269660 | 9/2002 |
| JP | 2004-038881 | 2/2004 |
| JP | 2004-505574 | 2/2004 |
| WO | WO 02/11483 A1 | 2/2002 |
| WO | WO 2004/084530 | 3/2004 |
| WO | WO 2004/095816 | 11/2004 |

OTHER PUBLICATIONS

Written Opinion of the International Preliminary Examining Authority, mailed Apr. 3, 2007.

English Translation of Chinese Official Action, Apr. 8, 2011, in corresponding Chinese Application No. 200680002654.1.

3GPP TS 03.71 V8.9.0 (Jun. 2004), (Release 9), 110 pages.

3GPP TR 23.867 V0.7.1 (Dec. 2004), (Release 7), 73 pages.

Interim Standard (Trial Use Standard) Enhanced Wireless 9-1-1, Phase II, TIA/EIA/IS-J-STD-036, Aug. 2000.

Joint Standard, Enhanced Wireless 9-1-1 Phase 2, J-STD-036-A, Jun. 2002, pp. 1-294.

English summary of Japanese official action, May 27, 2011, in corresponding Japanese Application No. 2007-551227.

English Summary of Chinese official action, Feb. 13, 2012, in Chinese Application No. 2007-551227.

English Summary of Chinese official action, Mar. 1, 2012, in Chinese Application No. 200680002654.1.

Canadian Office Action mailed May 30, 2012 in corresponding Canadian Application No. 2,593,569.

* cited by examiner

METHOD AND APPARATUS FOR HANDLING EMERGENCY CALLS IN A PACKET SWITCHED RADIO ACCESS NETWORK

This application is the U.S. national phase of International Application No. PCT/SE2006/000078 filed 18 Jan. 2006, which designated the U.S. and claims priority to Sweden Application No. 0500165-6 filed 19 Jan. 2005, the entire contents of each of which are hereby incorporated by reference.

TECHNICAL FIELD

The technology described in this application relates generally to a method and apparatus for handling emergency calls in a multimedia service network, and in particular, to providing required location information to an emergency centre for a calling subscriber in a mobile access network.

BACKGROUND

In traditional circuit-switched telephony systems, emergency services are available for subscribers in situations of emergency, such as accidents and diseases. Emergency calls are typically first routed to an emergency centre which then connects the calls further to relevant emergency service stations, depending on the current situation, e.g. a hospital, a fire station or the police.

Details and requirements of emergency services are subject to regulations prevailing in different countries and regions. Typically, it is required that the telephony system can provide relevant location information in order to certify the location of the calling party. Firstly, it may be important to connect an incoming call to an emergency centre or service station being reasonably close to the caller. Secondly, the caller may not for some reason be able to provide crucial information regarding his/her whereabouts during the call to the emergency centre, at least not immediately.

In fixed public networks such as a PSTN (Public Switched Telephony Network), it is typically required that local exchanges therein add a "calling party identifier" to emergency calls when routed to an emergency centre. A local exchange has knowledge of which subscribers are connected to specific input lines in the exchange, each being associated with a specific calling party identifier, and adds such a calling party identifier to emergency calls. The emergency centre can then retrieve the geographic location from a location database in the public network by means of the received calling party identifier.

However, the location of a subscriber terminal is not permanent in the same way as before, and a terminal can be connected to an access network more or less regardless of its current geographic location, while still using the same subscriber identity. This is evidently the case for mobile terminals, but also for fixed portable terminals that can be jacked into different access points at different locations e.g. in an IP access network, e.g. for accessing various "broadband" services.

Figure 1:
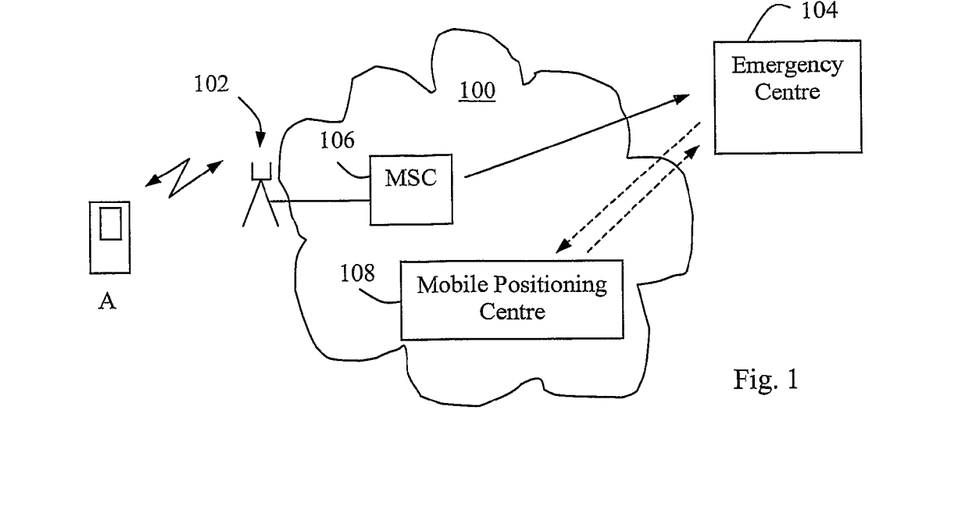
FIG. 1 is a schematic block diagram of a circuit-switched cellular mobile access network providing location information for an emergency call.

FIG. 1 is a simplified illustration of a mobile subscriber terminal A connected to a circuit-switched cellular mobile access network 100 by means of radio connection with a base station 102 providing radio coverage in a cell where the subscriber is currently located. An emergency centre 104 can be reached by subscribers in the network 100 over a transit network (not shown) such as PSTN/ISDN (Integrated Services Digital Network). In the figure, subscriber A makes an emergency call by dialling an SOS number or the like. The base station 102 is connected to an MSC (Mobile Switching Centre) 106 in the network 100, which routes the call to the emergency centre 104.

Network 100 further comprises a mobile positioning centre 108 adapted to provide location information on mobile subscribers in the network 100, including subscriber A, e.g. as geographic coordinates or the like. The position of subscriber A may be determined based on the identity of the cell in which the emergency call is made, which can be obtained from the serving MSC handling the call. This information could be sufficiently accurate, e.g. if the subscriber is located in a relatively small cell. However, more precise location information may also be obtained by means of a positioning function using various advanced methods. For example, the position of a connected mobile terminal can be calculated from signal strength measurements in the base station 102 and/or neighbouring base stations, sometimes referred to as "triangulation". Further, some mobile terminals are equipped with a GPS (Global Positioning Satellites) unit interacting with a GPS system, such that the positioning function can receive GPS based location information from either the terminal or from the GPS system.

Thus, the serving MSC 106 can supply location information to the emergency centre 104 when routing the call thereto, such as a cell identity or more specific information. The emergency centre 104 may also use available location services employed in the network 100, to determine the location of the calling party, if necessary.

In order to support emergency services, two main information elements have been defined in the current call control signalling standards ISUP (ISDN User Part) and BICC (Bearer Independent Call Control) for circuit-switched networks, namely "calling geodetic location" and "location number", the former indicating the geographic position of a calling party and the latter identifying a geographical area such as a region, country, city, etc. BICC is a call control protocol used between serving nodes. This protocol is based on the ISUP protocol, and was adapted to support the ISDN services independent of the bearer technology and signalling message transport technology used.

Further, the standard J-STD036-A defines an architecture connecting a circuit-switched mobile network with an emergency services network and messages required to identify and locate a calling party. Among other things, in support of location determination of subscribers making emergency calls, J-STD036-A defines functionality referred to as "MPC (Mobile Positioning Centre)" and "GMLC (Gateway Mobile Location Centre)" in mobile access networks, and "CRDB (Coordinate Routing Database)" in emergency services networks. For example, in a circuit-switched mobile network using the ANSI-41 standard, the node MPC communicates with MSC nodes over interface E3, with the CRDB node in an emergency services network over interface E11, and with an emergency services network over interface E2. In a circuit-switched mobile network using the PCS 1900 standard, the node GMLC communicates with MSC nodes over interface Lg, with the CRDB node in an emergency services network over interface E11, and with an emergency services network over interface E2.

Although the examples above are relevant for traditional circuit-switched telephone networks, the evolution of telecommunication is generally moving towards packet-switched networks. Various communication networks and terminals are used today that are capable of packet-based multimedia communication using IP (Internet Protocol), including fixed or mobile computers and telephones. Multimedia services typically entail IP based transmission of encoded data representing media in different formats and combinations, including audio, video, images, text, documents, animations, etc.

It has not yet been solved how to provide the necessary location information in support of emergency calls over packet-switched IP networks. It is possible to employ an architecture connecting a packet-switched mobile network with an emergency service network and signalling messages according to the standard J-STD036-A, but this would result in great costs and delays. An alternative and more simple inter-working solution is desirable in this context.

A network architecture called "IP Multimedia Subsystem" (IMS) has been developed by the $3^{rd}$ Generation Partnership Project (3GPP) as an open standard for handling multimedia services and communication sessions in the packet domain. IMS networks can also be used for emergency services, although it remains to be solved how to provide relevant location information when required. IMS is a platform for enabling services based on IP transport more or less independent of the access technology used, and will be briefly outlined here.

The IMS network is thus used for generally controlling multimedia sessions, and a specification called "SIP" (Session Initiation Protocol, according to the standard IETF RFC 3261) is used for handling multimedia sessions in IMS networks. SIP is an application-layer protocol used by IMS networks and terminals to establish and control IP based multimedia communications. When sending SIP messages, an addressing element called "SIP URI" (Uniform Resource Identifier) is used, such that one SIP URI indicates the source and another one indicates the destination in each message.

Figure 2:
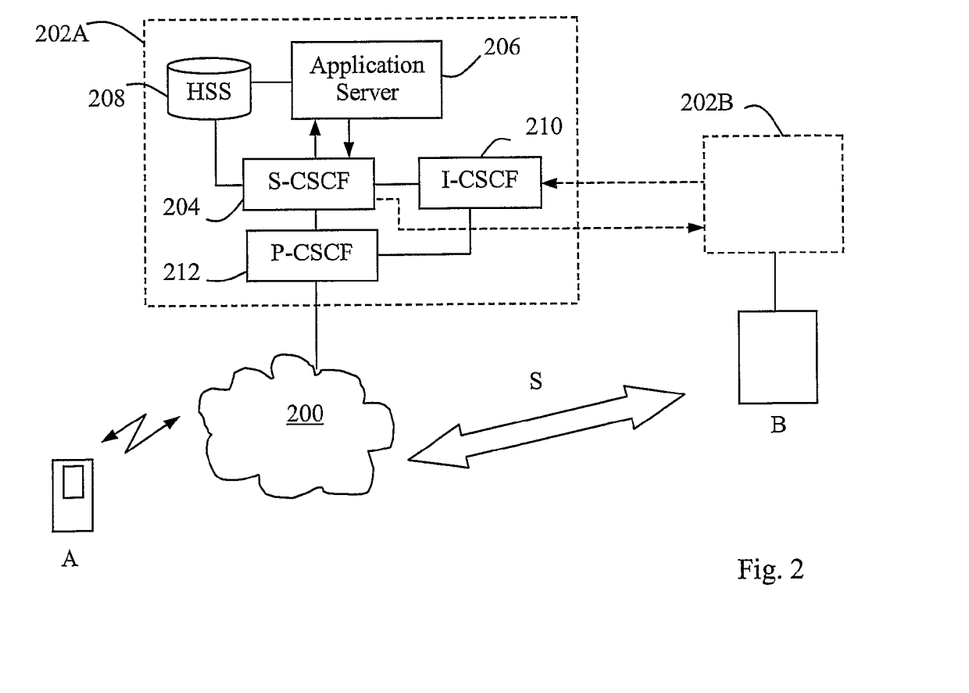
FIG. 2 is a schematic block diagram of a communication scenario including an IMS network.

FIG. 2 is an exemplary schematic illustration of a basic scenario when multimedia services are provided for a mobile terminal A by means of an IMS service network. Terminal A is connected to a mobile access network 200 and communicates media with a remote party B, such as another terminal or server, in an IP communication session S. An IMS network 202A is connected to the mobile access network 200 and handles the session with respect to terminal A, where networks 200 and 202 are typically owned by the same operator. Moreover, if a terminal is connected to a visited access network, multimedia services are handled by the terminal's "home" IMS network, i.e. where it is registered as a subscriber. The remote party B may be connected to another corresponding IMS network 202B. It should be noted that mobile access networks of today are typically divided into a circuit-switched domain and a packet-switched domain.

The illustrated session S is basically managed by a node called S-CSCF (Serving Call Session Control Function) 204 assigned to terminal A in the IMS network 202A, and the used multimedia service is enabled and executed by an application server 206 connected to the IMS network 202. Basically, the S-CSCF node 204 serves as a proxy for the application server 206 towards terminal A, and sends SIP messages coming from terminal A towards the remote party B, as indicated by a dashed arrow. Further, a main database element HSS (Home Subscriber Server) 208 stores subscriber and authentication data as well as service information, among other things, that the application server 206 can fetch for executing services for subscribers.

A node called I-CSCF (Interrogating Call Session Control Function) 210 in IMS network 202 is connected to other IMS networks, including network 202B, and acts as a gateway for SIP messages arriving from such IMS networks. I-CSCF 210 receives SIP messages concerning the remote party B, as indicated by another dashed arrow. Another node in IMS network 202 called P-CSCF (Proxy Call Session Control Function) 212 acts as an entry point towards the IMS network 204 from any access network, such as mobile network 200, and all signalling messages between subscribers of the IMS network 204 are routed through the P-CSCF 212.

Of course, the IMS network 202 contains numerous other nodes and functions, such as further S-CSCF nodes and application servers, which are not shown here for the sake of simplicity. For example, media gateways (MGW) are used for generally converting packet-switched transport into circuit-switched transport, and a node called "Media Gateway. Control Function" (MGCF) translates packet-switched IMS signalling (e.g. according to SIP) into circuit-switched signalling (e.g. according to ISUP).

As indicated above, it is desirable to satisfy prevailing emergency requirements for providing location information to an emergency centre for mobile subscribers in a safe and reliable manner, when emergency requests are made over an IP based multimedia service network, such as an IMS network using SIP signalling. However, it is a problem that signalling protocols for emergency networks have typically been implemented in the circuit-switched domain e.g. using ISUP signalling. To implement emergency services wholly in the packet domain, e.g. according to the standard J-STD036-A described above, would result in great costs and deployment delays.

In 3GPP, it has been proposed that a mobile terminal making an IP session request for an emergency call in a packet-switched mobile access network, e.g. by means of an SIP INVITE message, should supply the cell identity along with the request to the network. Thereby, the access network can select the most appropriate emergency centre based on the supplied cell identity, potentially using other network based location services as well, and route the request thereto. However, it has not been solved how to provide the location information to an emergency centre in the circuit-switched domain.

It is thus desirable to support emergency calls with location information when IP based multimedia services and networks are used. It is also desirable to maintain existing circuit-switched standards and infrastructures in emergency networks when providing such location information in emergency sessions by means of an IP based multimedia service network.

SUMMARY

It is an object to address at least some of the problems outlined above, and to provide a solution for providing location information for a mobile terminal to an emergency centre in connection with an IP based emergency session request. This object and others may be obtained by a method and apparatus according to the attached independent claims.

According to one aspect, a method, executed in a multimedia service network, provides location information for subscribers connected to a packet-switched mobile access network. When an emergency request is received from a subscriber containing a calling number, a location query for said calling number is sent to a mobile positioning centre in the mobile access network if more detailed location information is needed. In response thereto, location information is received for the subscriber, and a location indication for the subscriber is provided to a selected emergency centre in a circuit-switched control message, according to prevailing standards for initiating a circuit-switched emergency call.

The method is preferably executed in a media gateway control function used for translating packet-switched signalling messages into circuit-switched signalling messages, emulating the behaviour of a circuit-switched network towards the emergency centre. The media gateway control function may then emulate the behaviour of an MSC in a circuit-switched mobile access network, using the Lg interface or E3 interface as specified in the J-STD-036-A standard.

The emergency centre may be selected for the request, based on the received location information. The provided location indication may indicate the current location of the subscriber explicitly, e.g. as geographic coordinates or a street address or similar. Alternatively, the provided location indication may indicate the current location of the subscriber implicitly by means of a reference code or pointer, such that the emergency centre can use the location indication to retrieve location information from the mobile positioning centre, if needed. In the latter case, the received location information may be sent on the Lg interface or E3 interface as specified in the J-STD-036-A standard to the mobile positioning centre, and said reference code or pointer is then received as a response from the mobile positioning centre on said Lg interface or E3 interface.

When the emergency centre is connected to a circuit-switched transit network, the packet-switched emergency request is translated into said circuit-switched control message according to prevailing standards in the transit network, for initiating an emergency call with the emergency centre.

The multimedia service network may be an IMS network using SIP signalling, and said emergency request may then be an SIP INVITE message. Furthermore, the circuit-switched control message may be the message IAM according to the ISUP standard.

According to another aspect, an arrangement in a multimedia service network provides location information for subscribers connected to a packet-switched mobile access network. The arrangement comprises means for receiving an emergency request from a subscriber containing a calling number, means for sending a location query for said calling number to a mobile positioning centre in the mobile access network if more detailed location information is needed, means for receiving location information for the subscriber in response to the location query, and means for providing a location indication for the subscriber to a selected emergency centre in a circuit-switched control message, according to prevailing standards for initiating a circuit-switched emergency call.

The arrangement may preferably be implemented in a media gateway control function used for translating packet-switched signalling messages into circuit-switched signalling messages, emulating the behaviour of a circuit-switched network towards the emergency centre. The media gateway control function may then be configured to emulate the behaviour of an MSC in a circuit-switched mobile access network, using the Lg interface or E3 interface as specified in the J-STD-036-A standard.

The arrangement may further comprise logic means for selecting said emergency centre for the request, based on the received location information.

The provided location indication may indicate the current location of the subscriber either explicitly, e.g. as geographic coordinates or a street address or similar, or implicitly by means of a reference code or pointer, as mentioned above. In the latter case, the arrangement may further comprise means for sending the received location information on the Lg interface or E3 interface as specified in the J-STD-036-A standard to the mobile positioning centre, and means for receiving said reference code or pointer as a response from the mobile positioning centre on said Lg interface or E3 interface.

If the emergency centre is connected to a circuit-switched transit network, the arrangement further comprises means for translating the packet-switched emergency request into said circuit-switched control message according to prevailing standards in the transit network, for initiating an emergency call with the emergency centre.

In the arrangement, the multimedia service network may be an IMS network using SIP signalling, and said emergency request may then be an SIP INVITE message. Furthermore, the circuit-switched control message may be the message IAM according to the ISUP standard.

DESCRIPTION OF EXAMPLE EMBODIMENTS

Location information is obtained for a mobile subscriber connected to a mobile access network and for providing the location information to an emergency centre, in connection with a packet-switched emergency call from said subscriber. Different embodiments of this solution will now be described, initially with reference to FIG. 3.

Figure 3:
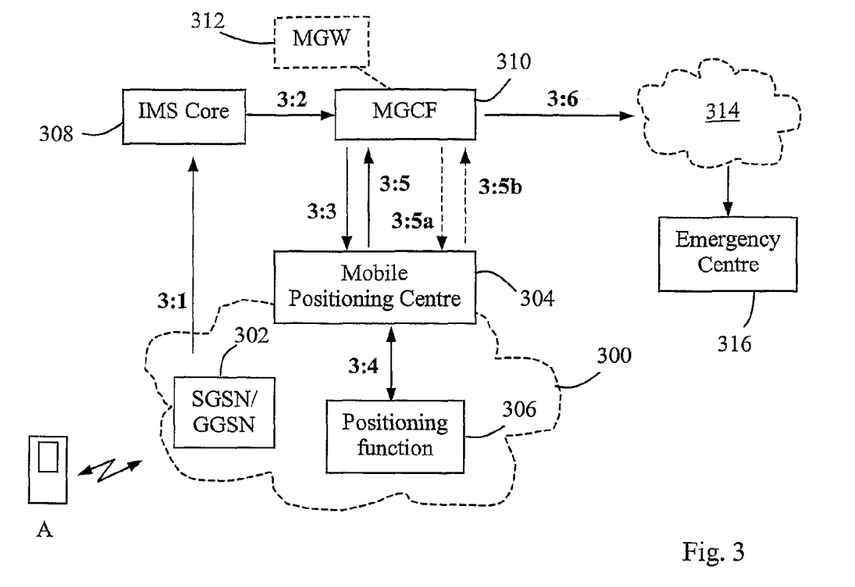
FIG. 3 is a block diagram of elements in a mobile access network and in a multimedia service network, illustrating a procedure for providing location information, according to one embodiment.

A subscriber A operating a mobile terminal capable of IP communication, is connected to a packet-switched mobile access network 300 at a certain location. The mobile access network 300 comprises a plurality of base stations (not shown), an SGSN/GGSN (Serving GPRS Support Node/ Gateway GPRS Support Node) 302 currently serving the subscriber A, a mobile positioning centre 304 and a positioning function 306. These nodes are typically present in any mobile access network.

The mobile positioning centre 304 is adapted to obtain the current location of subscribers in radio connection with base stations in the network 300. The positioning function 306 is adapted to provide location information on a cell level, if sufficient, or derive more precise location information by means of various calculation methods, as outlined above in the background section. The illustrated positioning function 306 is typically implemented in a radio network part of the mobile access network 300.

Mobile access network 300 is further connected to a multimedia service network, in this case an IMS network like the one described above for FIG. 2, containing an IMS core 308. Here, the IMS core 308 basically represents a session managing node used for handling messages from subscriber A, typically a P-CSCF node. The mobile access network 300 has a packet-switched domain for IP communication and may be adapted for "3G" mobile telephony using WCDMA (Wideband Code Division Multiple Access) and/or GPRS (General Packet Radio Service), although the technology described in this application is generally not limited in this respect. Further, the IMS network includes an MGCF 310 and an MGW 312 for communication with a circuit-switched transit network 314 to which an emergency centre 316 is connected.

Hence, subscriber A has access to multimedia services offered by means of IMS core 308 over the packet-switched domain in the mobile access network 300, and also to various emergency services by means of the emergency centre 316. Of course, the subscriber A can move freely within the radio coverage area of network 300 by connecting to different base stations, in a manner well-known in the art.

A first step 3:1 in the figure illustrates that the IMS core 308 receives an emergency request from subscriber A having dialled an SOS number or the like and being at a location unknown so far. It is assumed here that location information on the calling party is generally required in emergency calls, which should be available to the emergency centre 316 in connection with incoming emergency requests, as explained in the background section. Local regulations may further dictate the level of detail for the location information. Thus, the IMS network is generally obliged to retrieve such location information in connection with the emergency request of step 3:1, which is to be made available to the emergency centre.

According to prevailing standards, the request contains a calling number (or "A number") of the subscriber A, and is received as a session invitation such as an SIP INVITE message. The request may further contain a cell identity indicating the cell in which the subscriber is currently connected, which may be added to the request by the subscriber terminal.

As the received emergency request is in effect a session invitation for an emergency call, the IMS core 308 will set up a call with a suitable emergency centre. The IMS core can use the cell identity in the request to select a suitable emergency centre serving that cell area, in this case emergency centre 316. Alternatively, the cell identity is used merely to first select an MGCF to which the request is routed, such that the MGCF 310 then selects the emergency centre, e.g. based on more detailed location information, as will be described below.

Thus, a next step 3:2 illustrates that IMS core 308 routes the request further on to the relevant MGCF 310 handling communication with the circuit-switched transit network 314 to which emergency centre 316 belongs. If the MGCF 310 then determines that more detailed location information is required for further routing and/or for delivery to emergency centre 316, it contacts the mobile positioning centre 304.

Therefore in this case, MGCF 310 sends a location query in a step 3:3 including the calling number (or A number) received in the request, to the mobile positioning centre 304 in network 300 on a suitable interface, effectively asking for the current location of the subscriber of that calling number. In response thereto, mobile positioning centre 304 retrieves location information for the calling subscriber from the positioning function 306, in a next step 3:4. The positioning function 306 may use any suitable method for determining the location of subscriber A based on, e.g., signal strength measurements or GPS information as described above for FIG. 1, and the technology described in this application is not limited to any specific positioning methods. As a result, mobile positioning centre 304 is now able to respond to the location query of step 3:3 and may provide the obtained location information to MGCF 310, in a following step 3:5.

Depending on the implementation, the location information may then be presented by MGCF 310 to emergency centre 316 explicitly, e.g. as geographic coordinates or a street address or similar, or implicitly as a reference code or pointer. In the following description, the term "location indication" represents either explicit or implicit location information.

If the location information is to be given implicitly, MGCF 310 may first send the needed location information on the Lg or E3 interface as specified in J-STD-036-A to the mobile positioning centre 304, in an optional step 3:5a. Then, the mobile positioning centre 304 stores the actual location of subscriber A and provides an assigned reference code or pointer, such that the emergency centre can retrieve the actual location from the mobile positioning centre 304 using the reference code or pointer, if needed. The mobile positioning centre 304 then sends the assigned reference code or pointer on the Lg or E3 interface as specified in J-STD-036-A to MGCF 310, in a following optional step 3:5b.

In any case, the MGCF 310 now selects emergency centre 316 to be the receiver of the emergency request from subscriber A, e.g. based on the location indication obtained in step 3:5. Further, the MGCF 310 translates the packet-switched emergency request into a circuit-switched control message according to prevailing standards in the transit network 314, for initiating an emergency call with emergency centre 316. MGCF 310 also includes the obtained location indication in the control message and sends it to the emergency centre 316 in a next step 3:6.

In this way, the MGCF provides in effect an emergency service inter-working function emulating the behaviour of a circuit-switched network towards the transit network 314 and the emergency centre 316, and optionally also towards the mobile positioning centre 304.

If ISUP is used in network 314, a call initiation message called IAM (Initial Address Message) can be used for conveying the location indication to the emergency centre 316. It should be noted that the location indication may be either explicit or implicit, as described above. If implicit, e.g. a reference code or number or pointer, the emergency centre 316 may query the mobile positioning centre 304 for the actual location of the calling subscriber at a later point, e.g. during or after the call depending on the nature of the emergency.

The above described solution makes it possible to obtain and provide required location information to an emergency centre in a circuit-switched network in connection with emergency calls over a multimedia service network coming from subscribers connected to a packet-switched mobile access network.

Figure 4:
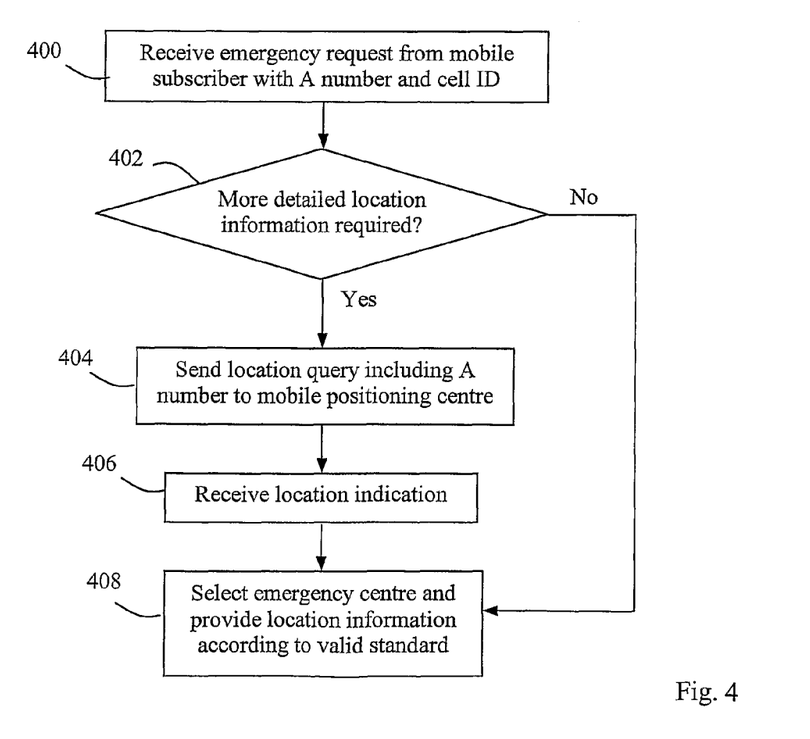
FIG. 4 is a flow chart illustrating a procedure for providing location information, according to another embodiment.

An exemplary procedure for providing location information for a subscriber connected to a mobile access network, according to one aspect, will now be described with reference to the flow chart in FIG. 4. The steps in the flow chart are defined for execution in a media gateway control function MGCF or other corresponding node in a multimedia service network, handling translation between packet-switched signalling (e.g. according to SIP in an IMS network) and circuit-switched signalling (e.g. according to ISUP in a PSTN/ISDN), particularly as illustrated in FIG. 3.

In a first step 400, a packet-switched emergency request is initially received over the multimedia service network from the subscriber containing a calling number (or A number) and optionally also a cell identity. In response thereto, it is determined in a step 402 whether the received request requires more detailed location information. For example, if a cell identity was included in the request, it may be determined if sufficiently detailed location information can be drawn from a received cell identity, or if more precise location must be indicated for the subscriber e.g. according to prevailing regulations for emergency calls. As mentioned above, the cell identity may correspond to a cell size that is small enough to specify the location of the calling subscriber satisfactorily.

If more detailed location information is required, a location query for the received calling number is sent to a mobile positioning centre in the mobile access network, in a next step 404. After proceedings in the mobile positioning centre, a location indication is received therefrom, in a following step 406. As mentioned above, the mobile positioning centre may use signal strength measurements and/or GPS information to obtain sufficiently detailed location information for the calling subscriber. If the location indication is implicit, the actual location of the subscriber is stored together with the location indication in the mobile positioning centre to make it available later upon request.

Next, a suitable emergency centre is selected and location information, in this case the location indication received in step 406, is provided with the emergency call request to the selected emergency centre, in a further step 408. It should be noted that the obtained location indication may also be used for selecting a suitable emergency centre, e.g. located in the same region as the subscriber's current location. If it is determined in step 402 that more detailed location information is in fact not required, e.g. if the cell identity is sufficient, step 408 may be executed thereafter, omitting steps 404 and 406 in this case.

An arrangement in a media gateway control function MGCF adapted to operate in a multimedia service network, will now be briefly described with reference to FIG. 5. The MGCF 500 is basically adapted to execute the procedure steps illustrated in FIG. 4, and the procedure described for MGCF 310 in FIG. 3.

The MGCF 500 is connected to a media gateway MGW 500a and comprises first receiving means 502 configured to receive packet-switched emergency requests R from subscribers over the multimedia service network, said subscribers being connected to a mobile access network. MGCF 500 further comprises sending means 504 configured to send location queries Q to a mobile positioning centre in a mobile access network where said subscribers are connected, if more detailed location information is needed for the subscribers, e.g. to fulfil prevailing regulations or other requirements for emergency calls. MGCF 500 further comprises second receiving means 506 configured to receive location indications L from the mobile positioning centre in response to said queries Q.

MGCF 500 also comprises providing means 508 configured to provide obtained location indications L with circuit-switched control messages for emergency requests R(L) to selected emergency centres, in a suitable manner according to standards valid for the selected emergency centres. Said control messages may be regular call setup messages or the like, e.g. the message IAM according to the standard ISUP. Each emergency request R(L) is thus sent to a selected emergency centre, optionally selected based on the obtained location indication L. The providing means 508 may be configured to provide the location indications L either as explicit or implicit location information for the calling subscriber, as described above.

MGCF 500 may further comprise a logic means 510 for controlling the operation of the different means 502-508, and optionally also for selecting a suitable emergency centre for the emergency requests E(L), based on obtained location information L. The logic means 510 may also be configured to recognise whether an incoming multimedia request is directed to an emergency service, to determine if location information is to be provided with the request or not, and to determine if more detailed location information is needed.

Figure 5:
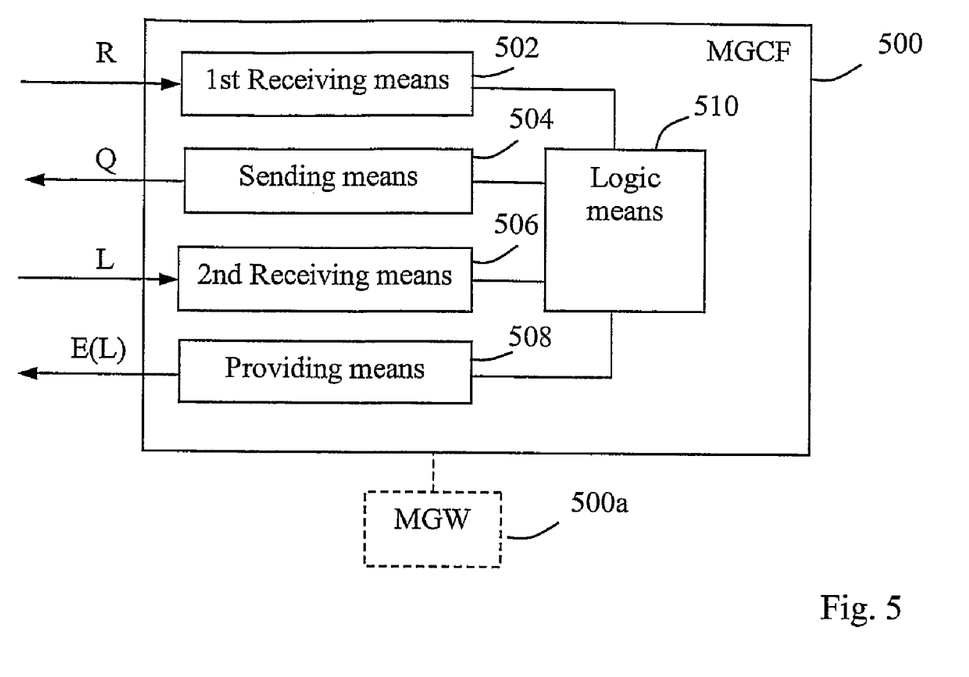
FIG. 5 is a block diagram of a multimedia gateway control function in a multimedia service network, according to yet another embodiment.

It should be noted that FIG. 5 illustrates logically the basic functional elements of the MGCF 500. However, the skilled person is free to put them into practice in any suitable manner not limited to the shown disposition.

The technology described in this application offers a simple yet reliable mechanism for obtaining required location information and for providing it to an emergency centre in a circuit-switched network, in response to packet-switched emergency requests from subscribers connected to a mobile access network and requesting emergency services from a multimedia service network. In particular, the above-described MGCF can emulate the behaviour of an MSC in a circuit-switched mobile access network, e.g. using the Lg or E3 interface as specified in the J-STD-036-A standard.

While the description referred to specific example embodiments, the description should not be taken as limiting the scope of the claims. For example, the SIP signalling protocol and IMS concept have been used throughout when describing the above embodiments, although any other standards and service networks for enabling multimedia communication may basically be used. Further, the technology is not limited to any particular emergency services but may be used for providing location information to any type of emergency request. The present invention is defined by the appended claims.

The invention claimed is:

1. A method in a multimedia service network of providing location information to an emergency center in a circuit-switched network for a mobile radio terminal connected to a packet-switched mobile access network, comprising the following steps:
   receiving a packet-switched emergency request from the mobile radio terminal containing a calling number,
   sending a location query for said calling number to a mobile radio terminal positioning center in a mobile radio access network when more detailed location information is needed,
   receiving a location indication for the mobile radio terminal in response to the location query,
   translating the packet-switched emergency request into a circuit-switched control message for said emergency request, and
   sending the translated circuit-switched control message including the location indication for the mobile radio terminal to the emergency center according to prevailing standards for initiating a circuit-switched emergency call,
   wherein the method is executed in a media gateway control function node, coupled to the mobile radio terminal positioning center, a packet-switched core network node coupled to the mobile radio access network, and the emergency center, that translates packet-switched signalling messages into circuit-switched signalling messages to emulate the behavior of a circuit-switched network towards the emergency center,
   wherein the multimedia service network is an IP Multimedia Subsystem (IMS) network using Session Initiation Protocol (SIP) signalling, and
   wherein the emergency request is an SIP INVITE message.

2. A method according to claim 1, wherein the media gateway control function emulates the behavior of a mobile switching center (MSC) in a circuit-switched mobile access network, using an Lg interface or E3 interface as specified in the J-STD-036-A standard.

3. A method according to claim 1, wherein said emergency center is selected for the request based on the received location information.

4. A method according to claim 1, wherein said location indication indicates the current location of the mobile radio terminal as geographic coordinates or a street address.

5. A method according to claim 1, wherein said location indication indicates the current location of the mobile radio terminal using a reference code or pointer such that the emergency center can use the location indication to retrieve location information from the mobile positioning center, if needed.

6. A method according to claim 5, wherein the received location information is sent on an Lg interface or E3 interface as specified in the J-STD-036-A standard to the mobile positioning center, and said reference code or pointer is then received as a response from the mobile positioning center on said Lg interface or E3 interface.

7. A method according to claim 1 wherein the circuit-switched control message is an IAM message according to the ISUP standard.

8. An arrangement in a multimedia service network for providing location information to an emergency center in a circuit-switched network for a mobile radio terminal connected to a packet-switched mobile access network, comprising:
 means for receiving a packet-switched emergency request from the mobile radio terminal containing a calling number,
 means for sending a location query for said calling number to a mobile radio terminal positioning center in a mobile radio access network when more detailed location information is needed,
 means for receiving a location indication for the mobile radio terminal in response to the location query,
 means for translating the packet-switched emergency request into a circuit-switched control message for said emergency request, and
 means for sending the translated circuit-switched control message including the location indication for the mobile radio terminal to the emergency center according to prevailing standards for initiating a circuit-switched emergency call,
 wherein the arrangement is implemented in a media gateway control function node coupled to the mobile radio terminal positioning center, to a packet-switched core network node, and to the emergency center, the media gateway control function node being configured to translate packet-switched signalling messages into circuit-switched signalling messages to emulate the behavior of a circuit-switched network towards the emergency center,
 wherein the multimedia service network is an IMS network using SIP signalling, and
 wherein said emergency request is an SIP INVITE message.

9. An arrangement according to claim 8, wherein the media gateway control function is configured to emulate the behavior of an MSC in a circuit-switched mobile access network using an Lg interface or E3 interface as specified in the J-STD-036-A standard.

10. An arrangement according to claim 8, further comprising logic means for selecting said emergency center for the request based on the received location information.

11. An arrangement according to claim 8, wherein said location indication indicates the current location of the mobile radio terminal as geographic coordinates or a street address.

12. An arrangement according to claim 8, wherein said location indication indicates the current location of the mobile radio terminal using a reference code or pointer such that the emergency center can use the location indication to retrieve location information from the mobile positioning center, if needed.

13. An arrangement according to claim 12, further comprising means for sending the received location information on an Lg interface or E3 interface as specified in the J-STD-036-A standard to the mobile positioning center, and means for receiving said reference code or pointer as a response from the mobile positioning center on said Lg interface or E3 interface.

14. An arrangement according to claim 8, wherein the circuit-switched control message is an IAM message according to the ISUP standard.

* * * * *